United States Patent
Ziglar

(12) 
(10) Patent No.: US 11,354,473 B1
(45) Date of Patent: Jun. 7, 2022

(54) METHOD AND SYSTEM FOR DESIGNING A ROBOTIC SYSTEM ARCHITECTURE WITH OPTIMIZED SYSTEM LATENCY

(71) Applicant: Argo AI, LLC, Pittsburgh, PA (US)

(72) Inventor: Jason Ziglar, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

(21) Appl. No.: 17/160,758

(22) Filed: Jan. 28, 2021

(51) Int. Cl.
  *G06F 30/327* (2020.01)
  *G06F 8/20* (2018.01)
  *G06F 30/337* (2020.01)
  *G06F 117/08* (2020.01)

(52) U.S. Cl.
  CPC .............. *G06F 30/327* (2020.01); *G06F 8/20* (2013.01); *G06F 30/337* (2020.01); *G06F 2117/08* (2020.01)

(58) Field of Classification Search
  CPC ........ G06F 30/327; G06F 8/20; G06F 30/337; G06F 2117/08
  See application file for complete search history.

(56) References Cited

U.S. PATENT DOCUMENTS

| 10,042,614 B1 * | 8/2018 | Bharti | ................... G06F 11/302 |
| 2021/0192314 A1 * | 6/2021 | Aarts | ...................... G06F 8/456 |

OTHER PUBLICATIONS

Ziglar, J. et al., "Context-Aware System Synthesis, Task Assignment and Routing," IIEE, arXiv:1706.04580v2 [cs.RO], Aug. 2017, pp. 1-17.
Ter Break, T. et al., "Dynamic Resource Allocation," Centre for Telematics and Information Technology, Feb. 29, 2016, pp. 1-45.

* cited by examiner

*Primary Examiner* — Nha T Nguyen
(74) *Attorney, Agent, or Firm* — Fox Rothschild LLP

(57) ABSTRACT

Systems and methods for designing a robotic system architecture are disclosed. The methods include defining a software graph including a first plurality of nodes, and a first plurality of edges representative of data flow between the first plurality of tasks, and defining a hardware graph including a second plurality of nodes, and a second plurality of edges. The methods may include mapping the software graph to the hardware graph, modeling a latency associated with a computational path included in the software graph for the mapping between the software graph and the hardware graph, allocating a plurality of computational tasks in the computational path to a plurality of the hardware components to yield a robotic system architecture using the latency, and using the robotic system architecture to configure the robotic device to be capable of performing functions corresponding to the software graph.

24 Claims, 5 Drawing Sheets

METHOD AND SYSTEM FOR DESIGNING A ROBOTIC SYSTEM ARCHITECTURE WITH OPTIMIZED SYSTEM LATENCY

BACKGROUND

Real-time computing systems such as robotic systems (e.g., autonomous vehicles) need to be responsive. Such systems have a set of deadlines, and missing a deadline is considered either a system failure and/or degrades the quality of service. In such systems, a delay of less than a millisecond in the system can, in some situations, cause a failure. Many applications of real-time computing are also low-latency applications (e.g., autonomous vehicles must be reactive to sudden changes in the environment). Moreover, a robotic system such as an autonomous vehicle performs several successive operations on sensor data with the output of one operation used as the input of another operation (e.g., pipeline stages). As such, real-time computer systems and applications often require low latency. Therefore, for a system design to meet the needs of such robotic systems, the core software and hardware components must not interfere with the requirements of real-time computing.

The design and organization of such complex robotic systems traditionally requires laborious trial-and-error processes to ensure both hardware and software components are correctly connected with the resources necessary for computation. Optimizing system properties such as latency often becomes intractable due to the number of components involved (compute hardware, communication networks, communication protocols, software allocation, etc.). Current approaches for optimizing system performance primarily address resource allocation issues (e.g. memory usage, bandwidth utilization), but not latency. However, as discussed above, latency is a critical factor in optimizing system performance for real time systems for improving system performance and hitting important safety goals such as ensuring system reaction times are sufficient.

This document describes methods and systems that are directed to addressing the problems described above, and/or other issues.

SUMMARY

In various scenarios, systems and methods for designing a robotic system architecture are disclosed. The systems may include a processor and non-transitory computer readable medium including programming instructions that can be executed by the processor to perform the methods of this disclosure. The system may define a software graph and a hardware graph. The software graph may include a first plurality of nodes representing discrete computational tasks, and a first plurality of edges representative of data flow between the first plurality of tasks. The hardware graph may include a second plurality of nodes representing hardware components of a robotic device, and a second plurality of edges representative of communication links between the second plurality of nodes. The system may map the software graph to the hardware graph by assigning each of the first plurality of nodes to one of the second plurality of nodes and each of the first plurality of edges to one or more of the second plurality of edges. For the mapping, the system may then model a latency associated with a computational path included in the software graph, and allocate (based on the latency) a plurality of computational tasks in the computational path to a plurality of the hardware components to yield a robotic system architecture. The system may use the robotic system architecture to configure the robotic device to be capable of performing functions corresponding to the software graph. Optionally, the software graph may be a multigraph and the hardware graph may be a pseudograph.

In various implementations, the system may also update the mapping of the software graph to the hardware graph by defining an objective function comprising a first cost of assigning a discrete computational task to a hardware component and a second cost of assigning a data flow to a communication link. Optionally, the system may minimize the objective function using a plurality of constraints, the plurality of constraints comprising at least one of the following: an atomicity constraint, a bandwidth constraint, a resource constraint, or a flow constraint. Additionally and/or alternatively, the system may minimize the objective function using the latency associated with the computational path included in the software multigraph.

In certain implementations, the system may model a system latency across all computational paths included in the robotic system, and then generate the robotic system architecture by allocating a plurality of computational tasks across all computations paths included in the robotic system to a plurality of hardware components for improving the performance of the robotic system architecture using the system latency.

In some implementations, the latency may be modeled as a function of a first latency introduced by the hardware components and a second latency introduced by the communication links. The second latency for a communication link may be modeled as a function of, for example, a number of messages currently assigned to that communication link, a average size of the currently assigned messages, a standard deviation of sizes of the currently assigned messages, a number of messages an additional communications link will add, and/or a size of the currently assigned messages. The first latency for a hardware component may be modeled as a function of input and output message timings from that hardware component. Optionally, one or more parameters for modeling the first latency may be determined based on checkpoint data corresponding to the robotic device.

The system may, in certain implementations, in the software graph: associate a type and an amount of resources required to execute a task associated with that node with each of the first plurality of nodes, and associate an amount of required bandwidth with each of the first plurality of edges. Additionally and/or alternatively, the system may in the hardware graph associate a type and an amount of resources provided by that node with each of the second plurality of nodes, and associating an amount of available bandwidth with each of the second plurality of edges.

DETAILED DESCRIPTION

Figure 1:
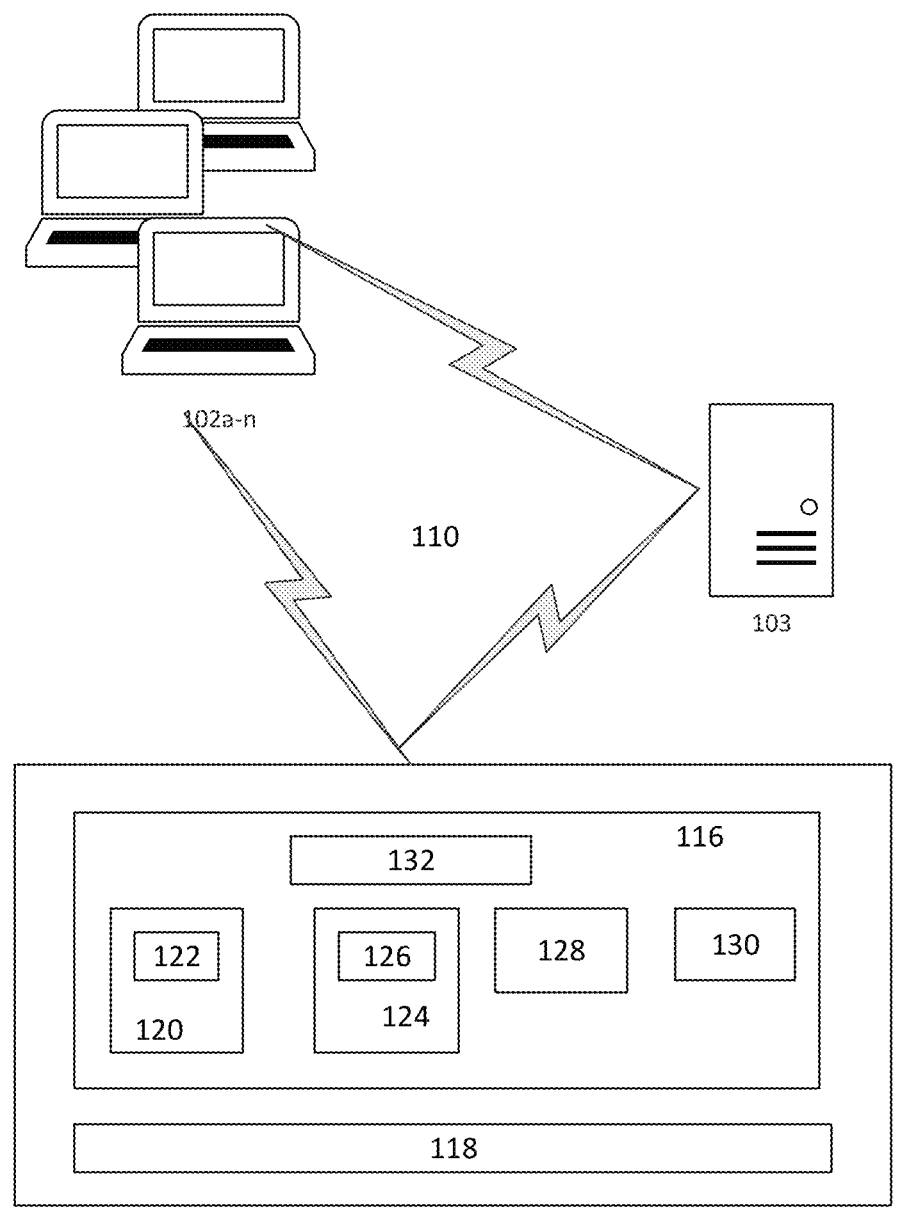
FIG. 1 is a schematic diagram illustrating an example system for designing a robotic system architecture.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

As noted in the Background section above, real-time tasks (for example, in robotic systems) are tasks for which the task has a predefined maximum threshold for delay between requesting a service from the robotic system and having the request fulfilled. Failure to service the real-time task within the threshold can cause serious failure of the task and/or systems managed by the real-time task. For robotic systems, latency may refer to a time lag between receipt of an input and production of an output based on the received input. For example, latency may be the time from when the first sensor inputs occur which would produce a particular response, to when the system actually produces such a response (e.g., time period between time of photons striking a camera sensor to the time when navigation of an autonomous vehicle is controlled based on the camera detection). Production of such an output may include assignment of a hardware resource (e.g., processor) for task execution, exclusive access to a resource, and the like. Latency typically includes other more specific latencies well known to those of skill in the art such as scheduling latency, task switching latency, and the like.

Embedded software architectures or platforms (middleware and real time operating systems) used in robots may be statically configured at design time with a fixed set of operating system tasks. In such robotic systems, some or all tasks that will execute on a given computing hardware may be allocated at runtime using, for example, a configuration file that specifies which tasks execute in which locations. Optionally, the assignment may be performed during compilation and/or linking. The current disclosure describes methods and systems for automatically constructing optimal robotic hardware and software systems from a set of available components, using queueing networks that optimize against key latency requirements. The disclosure provides a unified framework for enabling a wide array of capabilities in the design, development, and operation of robot systems. For design-time operation, the systems and methods of this disclosure automates the process of selecting components to build a complete system with some user-defined functionality, as well as generates the structure that relates all elements (e.g., connecting hardware, assigning tasks, and routing communications). By automating this stage, designs can be made more quickly and with more confidence in the validity of a given solution, since the entire problem is solved simultaneously. This also enables more robust consideration of system resiliency in design, since the impact of small changes in component parameterization (e.g., how much computing resources a particular task needs, the size of a particular message, the cost of using a particular sensor, etc.) can immediately be propagated to the global system design. The proposed systems and methods also help to ensure that the designed robotic system meets specified latency budgets, while helping to optimize resource utilization across the system (including latency). Furthermore, by automating the process, system resiliency can be extended by solving the design problem in an online setting, through the same process of generating solutions in response to local changes. For example, changes in the environmental context (e.g., transitioning from indoor to outdoor operation) can require different capabilities (e.g., using GPS for localization), changes in software performance (e.g., a task consuming more resources than anticipated) and changes in hardware components (e.g., computer failure) can require a reallocation of software tasks through the system. The ability to automatically synthesize a novel system capturing these requirements will allow for complex robotic systems that are more efficient and resilient by design.

Referring now to FIG. 1, a schematic diagram of an example system for designing a robotic system architecture is illustrated. "System design" or "system architecture design" refers to a process of defining the components (e.g., hardware and software architectures, interfaces, and data) and the interrelationships of the components of a system that is capable of executing a set of computational tasks with a user-defined set of functionality; and/or guidelines for implementing and building such a system. System architecture, as used herein, refers to a set of rules that defines the interconnectivity for a robotic system's hardware components as well as the mode of data transfer and processing exhibited by the robotic system to execute a software. The system 100 may design the architecture for a robotic system based on, for example, various robotic system components, task constraints, constraints provided by a user, or the like, in accordance with the methods described below. System 100 may include a plurality of clients 102a-n, a robotic system 110, and a design server 103 coupled to each other via one or more networks 104.

Clients 102a-n represent any suitable local or remote end-user device that facilitates communication between users and the design server 103. Clients 102a-n may be configured to receive information regarding the design of requested robotic system 110. The received information may include target values for design criteria of the robotic system, where design criteria may refer to robotic system context, constraints, standards, objectives, goals, and/or requirements for the implementation, performance, operation, integration, cost, and/or maintenance of the robotic system 110.

As shown in FIG. 1, a robotic system 110 includes a plurality of hardware components 116. The hardware components 116 may include, for example, processing units and memory 132 accessible to the processing units as well as logical access to peripherals of a robotic system 110. The processing units may include, for example, one or more central processing units (CPUs) 120, one or more graphical processing units (GPUs) 124, one or more digital signal processors (DSPs) 128, other processors 130 (e.g., field programmable gate arrays (FPGAs), FPGA-like devices, and/or reconfigurable instruction cell array (RICA) devices), or a combination thereof. One or more of the processing units may include more than one processing core. For example, each of the one or more CPUs 120 may include multiple processing cores 122. As another example, each of the one or more GPUs 124 may include multiple processing cores 126.

The robotic system 110 may also include a plurality of software resources 118. The software resources 118 may include, for example, sensor data processing applications, motion planning applications, graphical programming applications, machine learning applications, or the like. The hardware components 116 and the software resources 118 may be accessible to a task planner 114(a) (where tasks are described in and assigned process dependent parameters in accordance with a system design) and a scheduler 114(b) (where tasks are scheduled in accordance with a system design) of the robotic system 110. Information about the robotic system 110 is provided to the design server 103.

Figure 2:
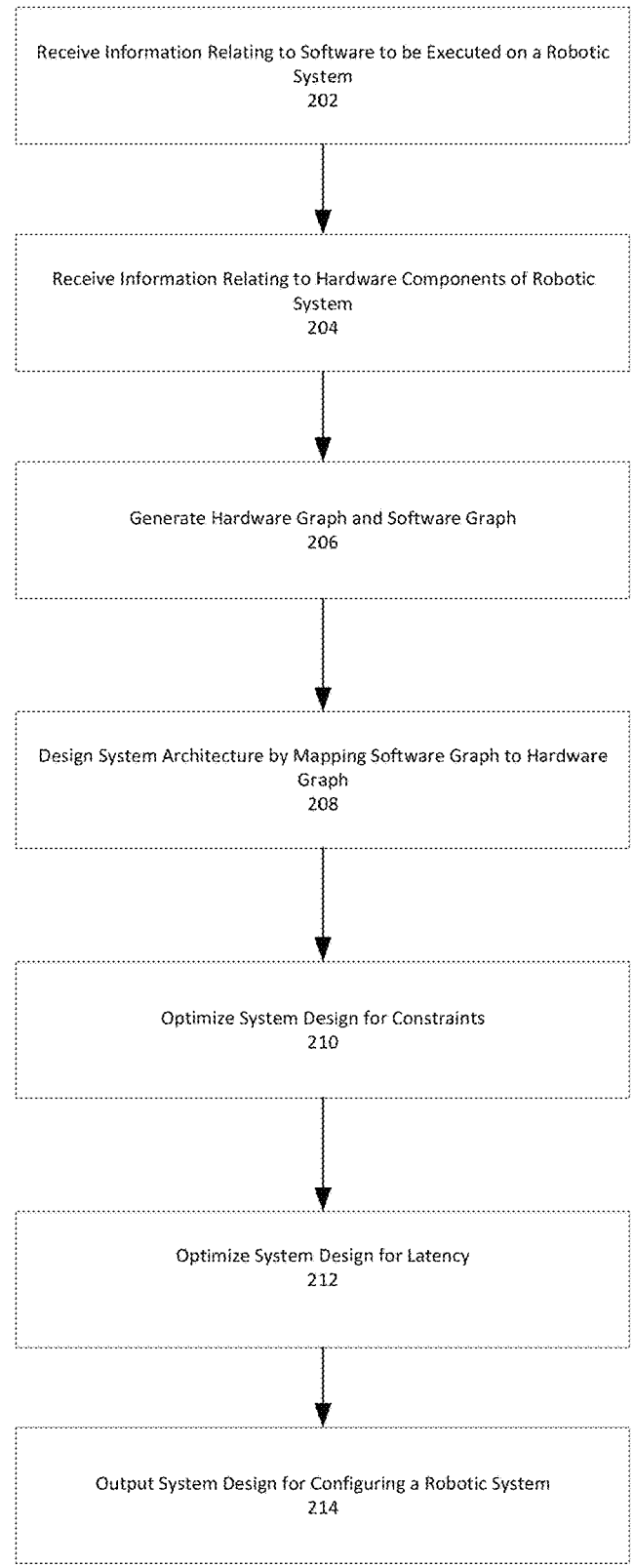
FIG. 2 is a flowchart illustrating an example method for designing a robotic system architecture.

Referring now to FIG. 2, a flowchart illustrating an example method for designing a robotic system architecture is shown. The method can be performed at design time, in real time, or at any suitable time. The method can be performed a predetermined number of times for a robotic system, iteratively performed at a predetermined frequency for a robotic system, or performed at any suitable time. Multiple instances of the method can be concurrently performed for multiple concurrent robotic systems. However, any suitable number of method instances can be performed at any suitable time. The method described in FIG. 2 a can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

At 202, the system may receive information relating to software that will be executed by a robotic system. As used herein, "software" refers to a set of instructions, data, or programs used to execute specific tasks or processes, where a task or process is any discrete computational process that has an input and an output. Tasks may consume computational resources, process and publish data, and interface with sensors and actuators; therefore a hardware component is required to provide these resources for task execution. Examples of such software in a robotic system may include, without limitations, path planner software, path tracker software, localization software, obstacle mapper software, operator GUI software, sensor interface software, or the like.

At 204, the system may receive information relating to hardware components of a robotic system. The hardware components of the robotic system can provide computational resources (such as available processing power, RAM, disk storage, or logical access to particular peripherals) and connections to other devices/systems for executing the tasks of a software. The hardware components may be heterogeneous such that not every device may provide every resource At 206, the system may generate a hardware graph corresponding to the hardware components of the robotic system and a software graph corresponding to the software. A graph is a combinatorial structure consisting of nodes and edges, where each edge links a pair of nodes. The two nodes linked by an edge are called its endpoints. Specifically, a graph $G=(V, E)$ is defined by a set of nodes $V=\{v_i=1, \ldots, I\}$, and a multiset of edges $E=\{e_i=\{v_i, v_j\} | v_i, v_j \in V\}$ which connect pairs of nodes. The vertices participating in edge $e_i$ are indexed in the form $e_{i,n}|n=1, 2$, also known as a loop if $e_{i,1}=e_{i,2}$. Restrictions on the set of edges E define several important classes of graphs: a simple graph possesses a set of edges E in which no edge is a loop; a multigraph possesses a multiset E with no loops; and a pseudograph possesses a multiset E possibly with loops. Additionally, if the order of vertices in edges is fixed, this defines a directed graph, otherwise a graph may be referred to as an undirected graph.

Figure 4:
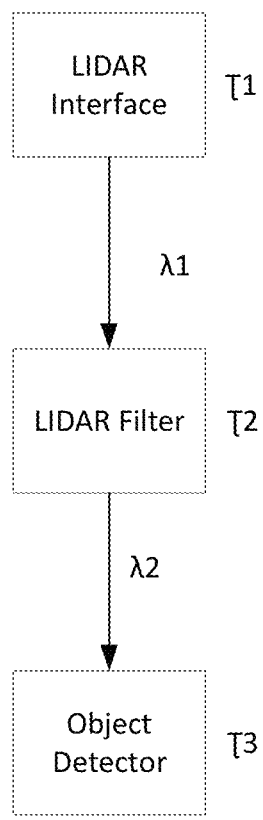
FIG. 4 illustrate an example software multigraph.

The graph generated for the software may be multigraph, where nodes and edges are referred to as tasks and links (as shown in FIG. 4). The multigraph may be directed with the first element in each edge representing the source, and the second representing a destination. In particular, the system defines a graph that includes a plurality of nodes representing discrete computational elements (i.e., tasks or processes) of a software routine that will perform the computational work and a plurality of edges connecting the nodes. Such a multigraph may be represented by the equation: $S=\{T, \Lambda\}$, where:

Nodes are represented as: $T=\tau_1, \ldots \tau_{|T|}$;

Edges are represented as: $\Lambda=\{\lambda_1, \ldots, \lambda_{|\Lambda|}\}$ and model the links that transmit data necessary for operation, and the output of computation used by other tasks.

Data flow between the nodes is represented as: $\lambda_1=\{\tau_1, \tau_O\}|\tau_i \neq \tau_O$ Unlike the hardware pseudograph, the edge multiset $\Lambda$ does not contain self-loops since tasks have internal access to generated data.

Figure 3:
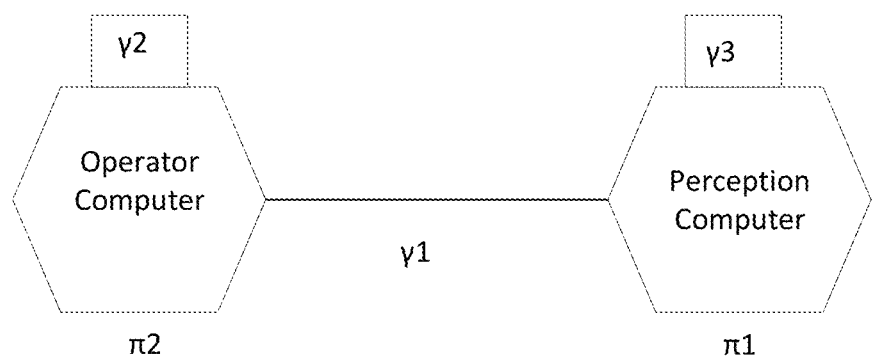
FIG. 3 illustrates an example hardware pseudograph.

The graph generated for the hardware components may be a pseudograph (shown in FIG. 3) including a set of nodes representing the hardware components that can provide computations resources and a set of undirected edges representing routes associated with connections between the hardware components that are capable of transmission of data associated with the software. Such a pseudograph may be represented by the equation: $H=\{\Pi, \Gamma\}$, where:

Nodes are represented as: $\Pi=\{\pi_i, \pi_O\}$;

Edges are represented as: $\Gamma=\{\gamma_1, \ldots, \gamma_{|\Gamma|}\}$; and

Data transmission connections between the hardware components are represented as:

$\gamma_k=\{\pi_i, \pi_O\}$.

This allows multiple connections between devices, since devices can be connected to each other via differing physical transports (e.g. both USB and Ethernet) or various forms of internal communication (e.g. shared memory or a loopback interface).

The system may then associate information and/or properties with the nodes and edges of the software and hardware graphs. For example, the resources required for a particular task may vary between devices, e.g. due to hardware specialization, where the resources consumed. Therefore, a given task τ may require a specific type/amount resources to execute that may vary depending on the hardware component executing a given task both in type (e.g. memory, CPU cycles, access to specific hardware) and magnitude (e.g. number of bytes, number of CPU cycles, etc.). The system, therefore, also associates with each task node in the software graph, the amount of a particular resource required to execute a task on a particular hardware component. This may be represented as an R-dimensional vector $C_\pi^\tau=<c_1, \ldots, c_R>$. Similarly, since each hardware component in the hardware graph provide a certain type of resource and their respective amount, which may be associated with the hardware component node as an R-dimensional vector $r_\pi=<r_1, \ldots, r_R>$, which is available to support task execution.

For edges in a hardware graph and the software graph, each route (i.e., hardware graph edge) provides a certain amount of bandwidth to support communication of information ($b_{\gamma_k}$). Specifically, connections provide finite bandwidth for transmitting data resulting in a set of bandwidth limits, and is a property of the hardware graph edges. Similarly, each link consumes a certain amount of bandwidth when traversing the specified route ($d_{\gamma_k}^{\lambda_j}$). These parameters are associated with the edges in the hardware graph and the software graph, respectively.

At 208, the system may map the software graph to the hardware graph in order to define a system design or configuration. This may be considered an assignment problem that requires assignment of tasks to devices and assignment of links to routes. Specifically, in order to define a complete computational system, there must also exist a mapping $\alpha_H^S: S \rightarrow H$, which defines how software executes on the specified hardware. A computational system is, therefore, defined as R={H, S, $\alpha_H^S$}, a set containing the hardware graph, software graph, and the assignment mapping. An assignment variable $\alpha_{\pi_d}^{\tau_t} \in \{0, 1\}$ defines whether task $\tau_t$ executes on device $\pi_d$, and an assignment variable $\alpha_{\gamma_k}^{\lambda_l} \in \{0, 1\}$ defines whether a link $\lambda_l$ transmits over a route $\gamma_k$.

The system may optimize the defined system design (210). In some implementations, the system may then identify a set of constraints, and use the constraints to optimize the system design. Examples of such constraints may include, without limitation, a constraint that a task can be assigned to only a single device (binary and atomicity constraint), a constraint that a link must be assigned to a set of routes which link the two devices on which two tasks are executing (flow constraint), a constraint that a set of tasks assigned to any device must not consume more resources than the device can provide (resource constraint—i.e., consumption of computational resources by tasks cannot over allocate device budgets), a constraint that links may not consume more bandwidth than the assigned hardware connection or route provides (bandwidth constraint), or the like. These constraints may be represented by the following equations:

Atomicity Constraint: $\sum_{\pi_d \in \Pi} \alpha_{\pi_d}^{\tau_t} = 1 \forall \tau_t \in T$ Flow Constraint: $\alpha_{\gamma_k}^{\lambda_l} + \sum_{\gamma_j \in E(\gamma_{k,1})} \alpha_{\gamma_i}^{\lambda_l,1} = \alpha_{\gamma_{k,2}}^{\lambda_l,2} + \sum_{\gamma_j \in E(\gamma_{k,2})} \alpha_{\gamma_j}^{\lambda_l} \forall \lambda_l \in \Lambda, \gamma_k \in \Gamma$ Resource Constraint: $\sum_{\tau_p \in T} \alpha_{\pi_d}^{\tau_p} \vec{c}_{\pi_d}^{\tau_p} \le r_{\pi_d} \forall \pi_d \in \Pi$ Bandwidth Constraint: $\sum_{\lambda_l \in \Lambda} \alpha_{\gamma_k}^{\lambda_l} d_{\gamma_k}^{\lambda_l} \le b_{\gamma_k} \forall \gamma_k \in \Pi$ The bandwidth constraint equation is formulated taking into account that the transfer of data between two connected tasks consumes bandwidth traversing a connection, with link $\lambda_l$ consuming $d_{\gamma_k}^{\lambda_l}$ worth of bandwidth over connection $\gamma_k$. The amount of bandwidth consumed can vary due to the differences in connections (e.g., packetized network overhead, requirements on data representations, etc.), requiring the bandwidth utilization to take the connection $\gamma_k$ into account as well. A link $\lambda_l$ may be assigned to transmit over a connection $\gamma_k$, denoted by the variable $\alpha_{\gamma_k}^{\lambda_l} \in \{0, 1\}$, which consumes the specified amount of bandwidth $d_{\gamma_k}^{\lambda_l}$. The bandwidth constraint equation ensures that the assignment of links to connections respects the bandwidth limits specified previously.

Tasks may be assigned to devices not directly connected to one another, requiring data routing along multiple connections. Multi-hop paths require routing data along a connected path between the devices assigned to each task. The flow constraint ensures these properties for all routes with a flow constraint stating that for any device interacting with a link, it must have either an odd number of connections and assigned to the relevant device (e.g., a source or sink) or an even number of connections transmitting the data (e.g., uninvolved or flowing through). This logic is formulated on a per-link basis to ensure a linear constraint.

Additional constraints must be introduced to ensure the graph structure produces a system with two key properties: consistency and viability. Consistency requires that the assignment variables represent a physically realizable system—devices cannot connect to non-existent devices, tasks cannot send or receive data from inactive tasks, and so forth. Viability ensures that the synthesized graphs support the requirements of all constituent elements, while still respecting the assignment and routing constraints described above. For instance, any generated hardware pseudograph must provide the necessary resources to support execution of the software multigraph; devices must have sufficient resources to support task execution, and the connections between devices must provide enough bandwidth for transferring data between tasks. Viability addresses only local concerns in generating graphs (e.g. ensuring devices can connect to one another, tasks have required resources and data inputs, etc.), deferring the treatment of systemic functionality to later constraints.

The system may also optimize the system design by formulating and using an objective functions that defines the quality of a system design such that system configurations that include desirable qualities or properties are favored over those that do not include such desirable qualities. Any now or hereafter known objective function may be used. For example, an objective function may be formulated to favor properties such as reducing or minimizing resource consumption, balancing load across system, reducing or minimizing energy consumption, or the like. Optionally, an objective function may be formulated to reduce or minimize the cost of assigning a task to a device ($f_{task}(\tau_t, \pi_d)$) and the cost of assigning a link to a route ($f_{link}(\lambda_l, \gamma_k)$). The system may can define both functions as the fractional utilization of resources available, and define $\omega$ as the relative weighting of utilizing device or link utilization as follows:

$$\sum_{\tau_t \in T} \sum_{\pi_d \in \Pi} \alpha_{\pi_d}^{\tau_t} f_{task}(\tau_t, \pi_d) + \omega \sum_{\gamma_k \in \Gamma} \sum_{\gamma_l \in \Lambda} \alpha_{\gamma_k}^{\lambda_l} f_{link}(\lambda_l, \gamma_k)$$

This allows for defining a core multi-resource quadratic assignment and routing problem by minimizing the objective function while maintaining the above identified constraints. Specifically, the system may optimize the system design (by providing an optimal mapping between the software graph and the hardware graph) using the following objective function:

$$Z = \min \sum_{\tau_t \in T} \sum_{\pi_d \in \Pi} \alpha_{\pi_d}^{\tau_t} f_{task}(\tau_t, \pi_d) + \omega \sum_{\gamma_k \in \Gamma} \sum_{\gamma_l \in \Lambda} \alpha_{\gamma_k}^{\lambda_l} f_{link}(\lambda_l, \gamma_k)$$

such that the following are satisfied:

$$\sum_{\pi_d \in \Pi} \alpha_{\pi_d}^{\tau_t} = 1 \forall \tau_t \in T$$

$$\alpha_{\gamma_{k,1}}^{\lambda_l,1} + \sum_{\gamma_i \in E(\gamma_{k,1})} \alpha_{\gamma_i}^{\lambda_l,1} = \alpha_{\gamma_i}^{\lambda_l,1} + \sum_{\gamma_i \in E(\gamma_{k,2})} \alpha_{\gamma_i}^{\lambda_l,1} \forall \lambda_l \in \Lambda, \lambda_k \in \Gamma$$

$$\sum_{\tau_p \in T} \alpha_{\pi_d}^{\tau_p} \vec{c}_{\pi_d}^{\tau_p} \le r_{\pi_d} \forall \pi_d \in \Pi$$

$$\sum_{\lambda_l \in \Lambda} \alpha_{\lambda_k}^{\lambda_l} d_{\lambda_k}^{\lambda_l} \le b_{\gamma_k} \forall \gamma_k \in \Gamma$$

At 212, the system may further help to optimize the system design for reducing or minimizing latency. Specifically, the system may introduce latency into the objective function model by computing latency across a computational path in the software graph as a function of latency introduced by a task node and latency introduced by a route.

The system may, for each task, first define rules for when a message will be emitted on a particular link in the software graph. For example, for an image processing task, the system may define rules to define when processed images will be send to, for example, a motion planning system. The system may do so by, receiving from the task nodes, input conditions that will lead to production of an output message. Thus, for each task node, the system may define a function property ($M_\tau(\lambda, S)$) for determining that when a given input message is received over an incoming link of task node, whether it results in generating a message on a specified outgoing link (for example, an image processing task may generate a processed image output every time a LIDAR image is received). Additionally and/or alternatively, the system may identify an average output period ($\bar{o}$) with a variation ($\sigma_o$) indicative of a periodic rate of message production at an outgoing link from the task node (for example, a sensor data publishing task may output a message every 5 seconds). Given these rules for when a task emits a message, the system may model when a task receives a message because ($M_\tau(\lambda, S)$) links an incoming message to the production of an output message. For example, for event based steps, the system may provide a mapping of input to output messages because when a task receives a message is the sum of the rates from preceding node publications that match the rule.

The latency induced by a task node when processing a message can then be modeled using the rules regarding input and output message timings from the task node, as determined above. For example, the system may model the latency using queueing theory. Specifically, the processing time may be modeled as the response from a server in a G/G/1 queue. This modeling may assume that the system is stationary at design time, since implementing this in the design time optimization problem enforces that the network cannot be overloaded (i.e., assuming steady state of some upper bound of the operating case at design time). The expected time for an output message can be estimated using Kingman's Formula, which requires knowledge of the average time to process a message p, the average input rate i, and the standard deviation of these two situations $\sigma_p$, $\sigma_i$. Therefore, the latency induced by a message passing through a task node can be estimated as:

$$L(\tau, \lambda_i) = \frac{\overline{p^2 i}}{1 - pi}\left(\frac{c_p^2 + c_i^2}{2}\right), \text{ where: } c_p = \frac{\sigma_p}{p}, c_i = \frac{\sigma_i}{i}$$

These parameters may be estimated based on checkpoint data and/or internal instrumentation corresponding to a robotic system. For example, the robotic system may validate and/or tune the parameters by comparing actual measured latency against modeled latency.

Latency across a route can be estimated through a variety of means. For example, for design time estimation, a model that can estimate the expected latency for transmitting data over a particular link may be used. As a first order approximation, the system may model this latency as a steady state of some upper bound of the operating case, at the expense of being able to model traffic bursts. For example, the latency across a single route may be modeled as a function of five parameters: the number of messages currently assigned to that route, the average size of those messages, the standard deviation of those message sizes, the number of messages an additional link would add, and the size of the assigned messages. This may be represented by: $L_\gamma(\lambda_{new}, \vec{\lambda}_{assigned})$.

The system may compute the latency of any computational path through the software graph, given the hardware graph and a mapping between them, using the task node latencies and route latencies in the computation path. Specifically, starting with some initial output message $\lambda_{1,l}$, and a destination task $\tau_f$, the system can define the end-to-end latency. Optionally, the system may, for P ($\lambda$, $\tau$, S) which is the function producing the connected path of links in the software graph connecting $\lambda$ to $\tau$ using the task defined transfer functions MT, define latency as follows:

$$L(\lambda_i, \tau, S) = \sum_{\lambda_k \in P(\lambda_{i,1}\tau_f, S)} L(\lambda_{k,2}\lambda_k) \in \sum_{\gamma_i \in \Gamma} \alpha_{\lambda_k}^{\lambda_l} L_\gamma(\lambda_k, \vec{\lambda}_{assigned})$$

The system may integrate this function into the multi-Resource quadratic assignment and routing problem described above by augmenting the problem with a set of end-to-end latency requirements, defined by a set of latencies $\theta_r = \{\phi_1 = <\lambda, \tau>, \ldots, \phi_{|\theta_r|}\}$ representative of the computational path and a vector of latency requirements $l_r = <t_1, \ldots, t_{|\theta_r|}>$. The system may then introduce an end-to-end latency constraint of the form:

$$L(\lambda_i, \tau, S) \leq \phi_t \forall \phi \in \theta_r$$

The system may, optionally, update the optimization function of step 210 by adding an additional term to the objective function based on a set of end-to-end latencies, in order to optimize these latencies as well. For example, the system can define a second set of latencies $\theta_o$ in the same way as the constraint form, which can include the constrained latencies, or any other set of end-to-end latencies possible in the system. Such an updated optimization function can be represented as:

$$Z = \min \sum_{\tau_t \in T} \sum_{\pi_d \in \Pi} \alpha_{\pi_d}^{\tau_t} f_{task}(\tau_t, \pi_d) +$$
$$\omega_\lambda \sum_{\gamma_k \in \Gamma} \sum_{\gamma_l \in \Lambda} \alpha_{\gamma_k}^{\lambda_l} f_{link}(\lambda_l, \gamma_k) + w_\phi \sum_{\phi \in \Theta_o} f_{latency}(\phi_\lambda, \phi_\tau, S) L(\phi_\lambda, \phi_\tau, S)$$

such that the following are satisfied:

$$\sum_{\pi_d \in \Pi} \alpha_{\pi_d}^{\tau_t} = 1 \forall \tau_t \in T$$

$$\alpha_{\gamma_{k,1}}^{\lambda_{l,1}} + \sum_{\gamma_i \in E(\gamma_{k,1})} \alpha_{\gamma_i}^{\lambda_{l,1}} = \alpha_{\gamma_{k,2}}^{\lambda_{l,1}} + \sum_{\gamma_j \in E(\gamma_{k,2})} \alpha_{\gamma_j}^{\lambda_l} \forall \lambda_l \in \Lambda, \lambda_k \in \Gamma$$

$$\sum_{\tau_p \in T} \alpha_{\pi_d}^{\tau_p \to \tau_p} c_{\pi_d}^{\tau_p} \leq r_{\pi_d} \forall \pi_d \in \Pi$$

$$\sum_{\lambda_l \in \Lambda} \alpha_{\lambda_k}^{\lambda_l} d_{\lambda_k}^{\lambda_l} \leq b_{\gamma_k} \forall \gamma_k \in \Gamma$$

$$L(\lambda_i, \tau, S) \leq \phi_t \forall \phi \in \Theta_r$$

In some example implementations, the system may optimize all link latencies directly because the structure of the software graph is fixed, and the latencies induced by computation through tasks may not vary as a function of the assignment. The system may, therefore, optimize latencies across the entire robotic system instead of certain specific and/or critical end-to-end latencies in an efficient manner.

This would result in an objective function of the following form, while the constraints would remain unchanged:

$$Z = \min \sum_{\tau_t \in T} \sum_{\pi_d \in \Pi} \alpha_{\pi_d}^{\tau_t} f_{task}(\tau_t, \pi_d) +$$

$$\omega_\lambda \sum_{\gamma_k \in \Gamma} \sum_{\gamma_l \in \Lambda} \alpha_{\gamma_k}^{\lambda_l} (f_{link}(\lambda_l, \gamma_k) + w_\phi f_{latency}(\lambda_l, \gamma_l))$$

While the description above uses the example application of a robotic device such as an autonomous vehicle, the processes described above are generally for designing a system at compile-time for use by any computing device during runtime. Other applications of these methods may include other computing device applications such as programs for scheduling jobs or tasks, encryption techniques and other cryptographic programs, and other applications that include a distributed computation system (e.g., cloud compute systems, computers using a CPUs and GPUs, multi-robot systems, etc.).

At 214, the system may output a system design or architecture for configuring a robotic system that may be capable of performing one or more software such as, sensor data processing, predictions, motions, planning, or the like.

It should be noted that while the above disclosure discusses the optimization of latency during a system design process, the disclosure is not so limiting. The above latency optimization may also be used as a validation step for an already designed system. Specifically, given a designed system, the above disclosure may be used to validate that the system meets certain latency requirements and/or estimate actual end-to-end latency. For performing such validation, the system may evaluate the above latency equations without the rest of the system optimization framework because the assignment variables (e.g., variables in the above equations denoted by a) are binary (can only take a value of 0 or 1), and the optimization function is a linear integer program. As such, for a given system design, plugging in the predetermined values may result in direct equations that can be evaluated for latency evaluation and estimation. For example, the current disclosure solves the equation below for all α values (second term on the right hand side) during system synthesis, and plugging in the values for a obtained during system synthesis in this equation will provide the end-to-end latency for a specified path.

$$L(\lambda_i, \tau, S) = \sum_{\lambda_k \in P(\lambda_{l,1} \tau_f, S)} L(\lambda_{k,2} \lambda_k) + \sum_{\gamma_i \in \Gamma} \alpha_{\lambda_k}^{\lambda_l} L_\gamma(\lambda_k, \vec{\lambda}_{assigned})$$

Figure 5:
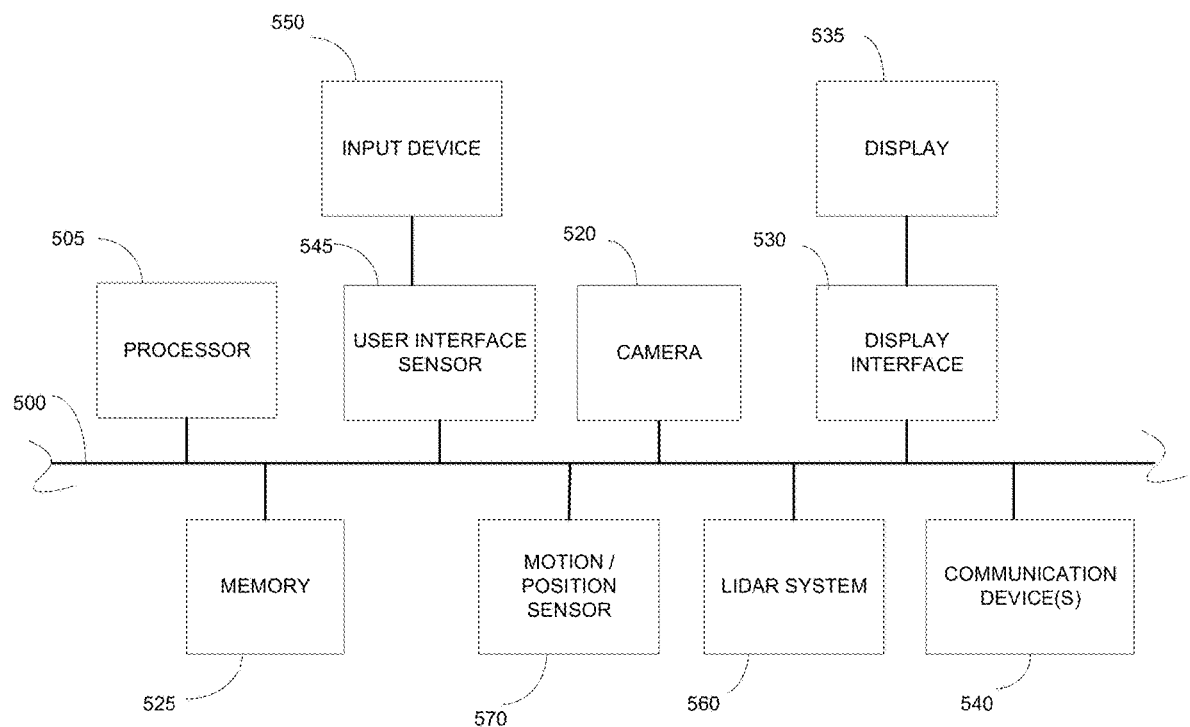
FIG. 5 illustrates example elements of an autonomous vehicle and/or external electronic device.

FIG. 5 is a block diagram that depicts example hardware elements that may be included in any of the electronic components of the system, such as internal processing systems of an robotic device or computing device, or remote servers (such as that associated with a design server). An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored. Various embodiments of the invention may include a computer-readable medium containing programming instructions that are configured to cause one or more processors, and/or devices to perform the functions described in the context of the previous figures.

An optional display interface 530 may permit information from the bus 500 to be displayed on a display device 535 in visual, graphic or alphanumeric format, such on an in-dashboard display system of the vehicle. An audio interface and audio output (such as a speaker) also may be provided. Communication with external devices may occur using various communication devices 540 such as a wireless antenna, a radio frequency identification (RFID) tag and/or short-range or near-field communication transceiver, each of which may optionally communicatively connect with other components of the device via one or more communication system. The communication device(s) 540 may be configured to be communicatively connected to a communications network, such as the Internet, a local area network or a cellular telephone data network.

The hardware may also include a user interface sensor 545 that allows for receipt of data (such as node and connection definition data) from input devices 550 such as a keyboard or keypad, a joystick, a touchscreen, a touch pad, a remote control, a pointing device and/or microphone.

The system also may include sensors that the system uses to detect actors in the environment. The sensed data may include digital image frames received from a camera 520 that can capture video and/or still images. The system also may receive data from a LiDAR system 560 such as that described earlier in this document. The system also may receive data from a motion and/or position sensor 570 such as an accelerometer, gyroscope or inertial measurement unit.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

As used herein, the term "task" refers to the smallest portion of a software program that an operating system (OS) can switch between a waiting or blocked state and a running state in which the task executes on a particular hardware resource. Tasks can come from a single software program or a plurality of software programs and typically include portions of the OS.

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" or "communicatively coupled" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

The invention claimed is:

1. A method for designing a robotic system architecture, the method comprising, by a processor:
    defining a software graph comprising:
        a first plurality of nodes representing discrete computational tasks, and
        a first plurality of edges representative of data flow between the first plurality of nodes;
    defining a hardware graph comprising:
        a second plurality of nodes representing hardware components of a robotic device, and
        a second plurality of edges representative of communication links between the second plurality of nodes;
    mapping the software graph to the hardware graph by assigning each of the first plurality of nodes to one of the second plurality of nodes and each of the first plurality of edges to one or more of the second plurality of edges;
    modeling, for the mapping between the software graph and the hardware graph, a latency associated with a computational path included in the software graph;
    allocating, using the latency, a plurality of computational tasks in the computational path to a plurality of the hardware components to yield a robotic system architecture; and
    using the robotic system architecture to configure the robotic device to be capable of performing functions corresponding to the software graph.

2. The method of claim 1, further comprising updating the mapping of the software graph to the hardware graph by defining an objective function comprising a first cost of assigning a discrete computational task to a hardware component and a second cost of assigning a data flow to a communication link.

3. The method of claim 2, further comprising minimizing the objective function using a plurality of constraints, the plurality of constraints comprising at least one of the following: an atomicity constraint, a bandwidth constraint, a resource constraint, or a flow constraint.

4. The method of claim 2, further comprising minimizing the objective function using the latency associated with the computational path included in the software graph.

5. The method of claim 1, further comprising:
    modeling a system latency across all computational paths included in the robotic system; and
    generating the robotic system architecture by allocating, using the system latency, a plurality of computational tasks across all computations paths included in the robotic system to a plurality of hardware components for improving the performance of the robotic system architecture.

6. The method of claim 1, wherein the latency is modeled as a function of a first latency introduced by the hardware components and a second latency introduced by the communication links.

7. The method of claim 6, wherein the second latency for a communication link is modeled as a function of the following parameters: a number of messages currently assigned to that communication link, a average size of the currently assigned messages, a standard deviation of sizes of the currently assigned messages, a number of messages an additional communications link will add, and a size of the currently assigned messages.

8. The method of claim 6, wherein the first latency for a hardware component is modeled as a function of input and output message timings from that hardware component.

9. The method of claim 8, wherein one or more parameters for modeling the first latency are determined based on checkpoint data corresponding to the robotic device.

10. The method of claim 1, wherein the software graph is a multigraph and the hardware graph is a pseudograph.

11. The method of claim 1, further comprising, in the software graph:
   associating, with each of the first plurality of nodes, a type and an amount of resources required to execute a task associated with that node; and
   associating, with each of the first plurality of edges, an amount of required bandwidth.

12. The method of claim 11, further comprising, in the hardware graph:
   associating, with each of the second plurality of nodes, a type and an amount of resources provided by that node; and
   associating, with each of the second plurality of edges, an amount of available bandwidth.

13. A system for designing a robotic system architecture, the system comprising:
   a processor; and
   a non-transitory computer readable medium comprising programming instructions, that when executed by the processor, cause the processor to:
      define a software graph comprising:
         a first plurality of nodes representing discrete computational tasks, and
         a first plurality of edges representative of data flow between the first plurality of nodes;
      define a hardware graph comprising:
         a second plurality of nodes representing hardware components of a robotic device, and
         a second plurality of edges representative of communication links between the second plurality of nodes;
      map the software graph to the hardware graph by assigning each of the first plurality of nodes to one of the second plurality of nodes and each of the first plurality of edges to one or more of the second plurality of edges;
      model, for the mapping between the software graph and the hardware graph, a latency associated with a computational path included in the software graph;
      allocate, using the latency, a plurality of computational tasks in the computational path to a plurality of the hardware components to yield a robotic system architecture; and
      use the robotic system architecture to configure the robotic device to be capable of performing functions corresponding to the software graph.

14. The system of claim 13, further comprising programming instructions, that when executed by the processor, cause the processor to update the mapping of the software graph to the hardware graph by defining an objective function comprising a first cost of assigning a discrete computational task to a hardware component and a second cost of assigning a data flow to a communication link.

15. The system of claim 14, further comprising programming instructions, that when executed by the processor, cause the processor to: minimize the objective function using a plurality of constraints, the plurality of constraints comprising at least one of the following: an atomicity constraint, a bandwidth constraint, a resource constraint, or a flow constraint.

16. The system of claim 14, further comprising programming instructions, that when executed by the processor, cause the processor to minimize the objective function using the latency associated with the computational path included in the software graph.

17. The system of claim 13, further comprising programming instructions, that when executed by the processor, cause the processor to:
   model a system latency across all computational paths included in the robotic system; and
   generate the robotic system architecture by allocating, using the system latency, a plurality of computational tasks across all computations paths included in the robotic system to a plurality of hardware components for improving the performance of the robotic system architecture.

18. The system of claim 13, wherein the latency is modeled as a function of a first latency introduced by the hardware components and a second latency introduced by the communication links.

19. The system of claim 18, wherein the second latency for a communication link is modeled as a function of the following parameters: a number of messages currently assigned to that communication link, a average size of the currently assigned messages, a standard deviation of sizes of the currently assigned messages, a number of messages an additional communications link will add, and a size of the currently assigned messages.

20. The system of claim 18, wherein the first latency for a hardware component is modeled as a function of input and output message timings from that hardware component.

21. The system of claim 20, wherein one or more parameters for modeling the first latency are determined based on checkpoint data corresponding to the robotic device.

22. The system of claim 13, wherein the software graph is a multigraph and the hardware graph is a pseudograph.

23. The system of claim 13, further comprising programming instructions, that when executed by the processor, cause the processor to, in the software graph:
   associate, with each of the first plurality of nodes, a type and an amount of resources required to execute a task associated with that node; and
   associate, with each of the first plurality of edges, an amount of required bandwidth.

24. The system of claim 13, further comprising programming instructions, that when executed by the processor, cause the processor to, in the hardware graph:
   associate, with each of the second plurality of nodes, a type and an amount of resources provided by that node; and
   associate, with each of the second plurality of edges, an amount of available bandwidth.

* * * * *